US011479265B2

(12) United States Patent
Zhu

(10) Patent No.: US 11,479,265 B2
(45) Date of Patent: Oct. 25, 2022

(54) INCREMENTAL LATERAL CONTROL SYSTEM USING FEEDBACKS FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 179 days.

(21) Appl. No.: 16/829,326

(22) Filed: Mar. 25, 2020

(65) Prior Publication Data
US 2021/0300411 A1 Sep. 30, 2021

(51) Int. Cl.
B60W 60/00 (2020.01)
B60W 10/20 (2006.01)
H04L 12/40 (2006.01)

(52) U.S. Cl.
CPC ........ *B60W 60/0011* (2020.02); *B60W 10/20* (2013.01); *B60W 60/0025* (2020.02); *H04L 12/40* (2013.01); *H04L 2012/40215* (2013.01); *H04L 2012/40273* (2013.01)

(58) Field of Classification Search
CPC ......... B60W 60/0011; B60W 60/0025; B60W 10/20; H04L 12/40; H04L 2012/40215; H04L 2012/40273
USPC .......................................................... 701/23
See application file for complete search history.

(56) References Cited

U.S. PATENT DOCUMENTS

| 5,838,562 | A | * | 11/1998 | Gudat | B60K 31/0008 |
| | | | | | 701/23 |
| 10,739,768 | B2 | * | 8/2020 | Liao-McPherson | G06F 17/11 |
| 11,124,202 | B1 | * | 9/2021 | Stark | B60W 50/0097 |
| 2016/0280258 | A1 | * | 9/2016 | Lavoie | B62D 5/0463 |

(Continued)

FOREIGN PATENT DOCUMENTS

| CN | 107329465 B | * | 8/2019 |
| DE | 102016225971 A1 | | 6/2018 |

(Continued)

OTHER PUBLICATIONS

Georgios et al., "Evaluation of End-to-End Learning for Autonomous Driving: The Good, the Bad and the Ugly," 2019, Publisher: IEEE.*

(Continued)

*Primary Examiner* — Tuan C To
(74) *Attorney, Agent, or Firm* — Womble Bond Dickinson (US) LLP

(57) ABSTRACT

Embodiments disclose a system and method to generate smooth steering commands for an autonomous driving vehicle (ADV). According to one embodiment, a system determines a planning steering command based on a driving trajectory of an ADV. The system receives a current steering feedback from a sensor of the ADV for a current planning cycle. The system generates one or more smooth steering commands based on the planning steering command and the current steering feedback over one or more planning cycles. The system controls the ADV based on the one or more smooth steering commands so a change in steering applied to the ADV for any planning cycle is within a predetermined steering change threshold for the ADV. That way, the system applies incremental changes for the steering of the ADV.

20 Claims, 9 Drawing Sheets

(56) References Cited

U.S. PATENT DOCUMENTS

| | | | |
|---|---|---|---|
| 2019/0077457 A1* | 3/2019 | Xu | B62D 15/029 |
| 2019/0294173 A1* | 9/2019 | Szubbocsev | B60W 60/0021 |
| 2020/0070888 A1* | 3/2020 | Millsap | B62D 6/04 |
| 2020/0079381 A1* | 3/2020 | Lombrozo | B62D 6/003 |
| 2020/0159233 A1* | 5/2020 | Zhang | B60W 50/0098 |
| 2020/0239067 A1* | 7/2020 | Wu | B62D 15/025 |
| 2020/0324788 A1* | 10/2020 | Ando | B60W 50/00 |
| 2020/0346688 A1* | 11/2020 | Otto | B62D 5/0481 |
| 2020/0391795 A1* | 12/2020 | Jeon | B62D 5/0457 |
| 2021/0129752 A1* | 5/2021 | Raeis Hosseiny | B62D 15/0285 |
| 2021/0261131 A1* | 8/2021 | Simmons | B60W 50/045 |
| 2021/0261160 A1* | 8/2021 | Wang | B60W 60/0015 |

FOREIGN PATENT DOCUMENTS

| | | | | |
|---|---|---|---|---|
| EP | 3321149 A1 | 5/2018 | | |
| EP | 3347785 A1 | 7/2018 | | |
| JP | 2605361 B2 * | 4/1997 | | |
| JP | 2002333922 A | 11/2002 | | |
| JP | 5218028 B2 * | 6/2013 | | |
| JP | 2017024683 A | 2/2017 | | |
| JP | 2019034646 A | 3/2019 | | |
| KR | 20180074676 A | 7/2018 | | |
| WO | 2011152214 A1 | 12/2011 | | |
| WO | WO-2012144911 A1 * | 10/2012 | | A61G 5/04 |
| WO | WO-2018021325 A1 * | 2/2018 | | B62D 1/286 |
| WO | 2018093419 A1 | 5/2018 | | |

OTHER PUBLICATIONS

Xin et al., "Online Sensing of Human Steering Intervention Torque for Autonomous Driving Actuation Systems," 2018, vol. 18, Publisher: IEEE.*

* cited by examiner

INCREMENTAL LATERAL CONTROL SYSTEM USING FEEDBACKS FOR AUTONOMOUS DRIVING VEHICLES

TECHNICAL FIELD

Embodiments of the present disclosure relate generally to operating autonomous vehicles. More particularly, embodiments of the disclosure relate to an incremental lateral control system using feedbacks for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A steering change rate of a vehicle controls how quickly a vehicle can steer laterally. A large steering change rate may cause overshoot and lead to oscillation in the vehicle steering. Some of the vehicles support steering change rate controls and some do not support steering change rate controls. This leads to inconsistent lateral control behaviors amongst different vehicles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments disclose a system and method to generate smooth steering commands for an autonomous driving vehicle (ADV). According to one embodiment, a system determines a planning steering command based on a driving trajectory of an ADV. The system receives a current steering feedback from a sensor of the ADV for a current planning cycle. The system generates one or more smooth steering commands based on the planning steering command and the current steering feedback over one or more planning cycles. The system controls the ADV based on the one or more smooth steering commands so a change in steering applied to the ADV for any planning cycle is within a predetermined steering change threshold for the ADV. That way, the system applies incremental changes for the steering of the ADV.

Figure 1:
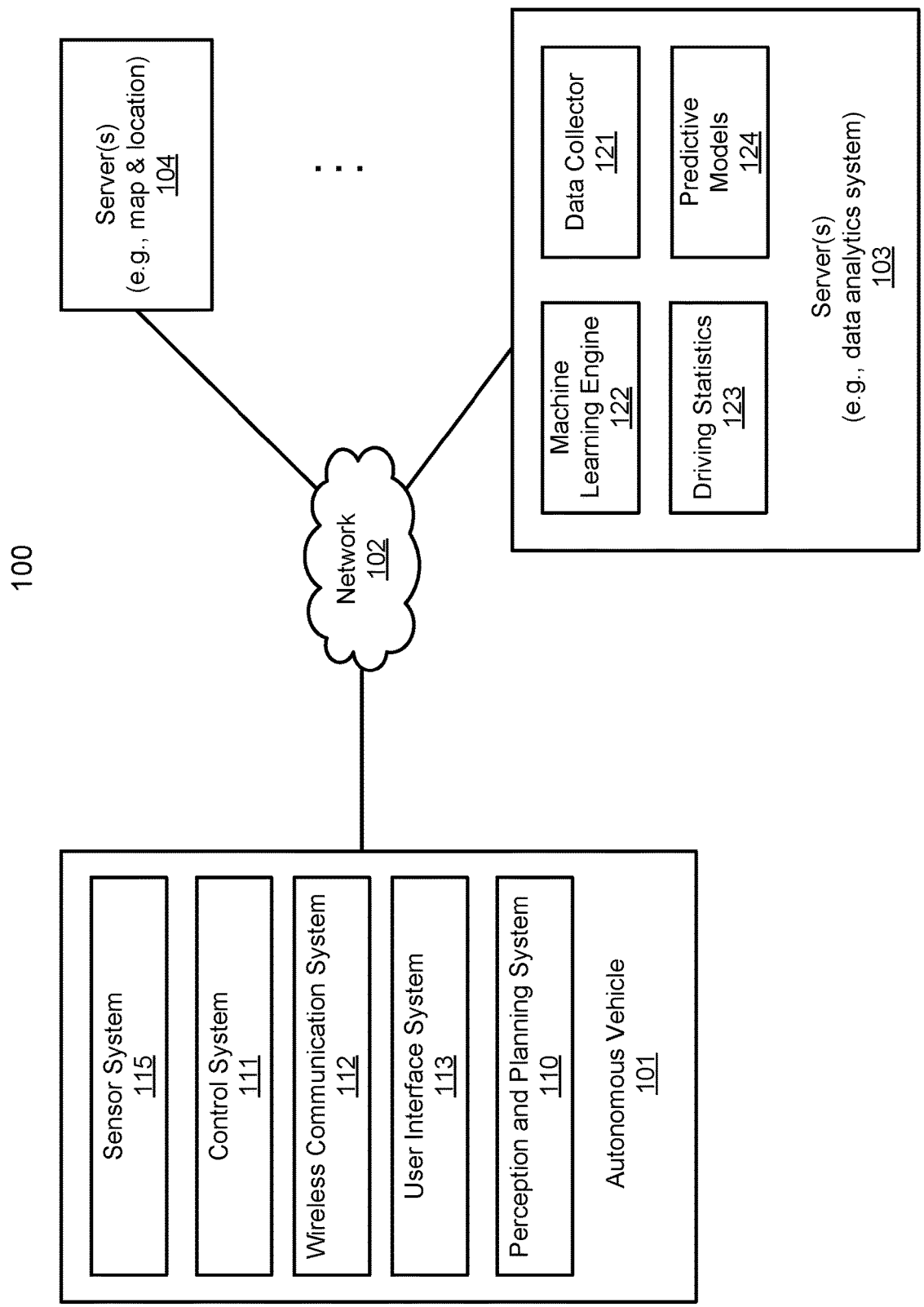
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
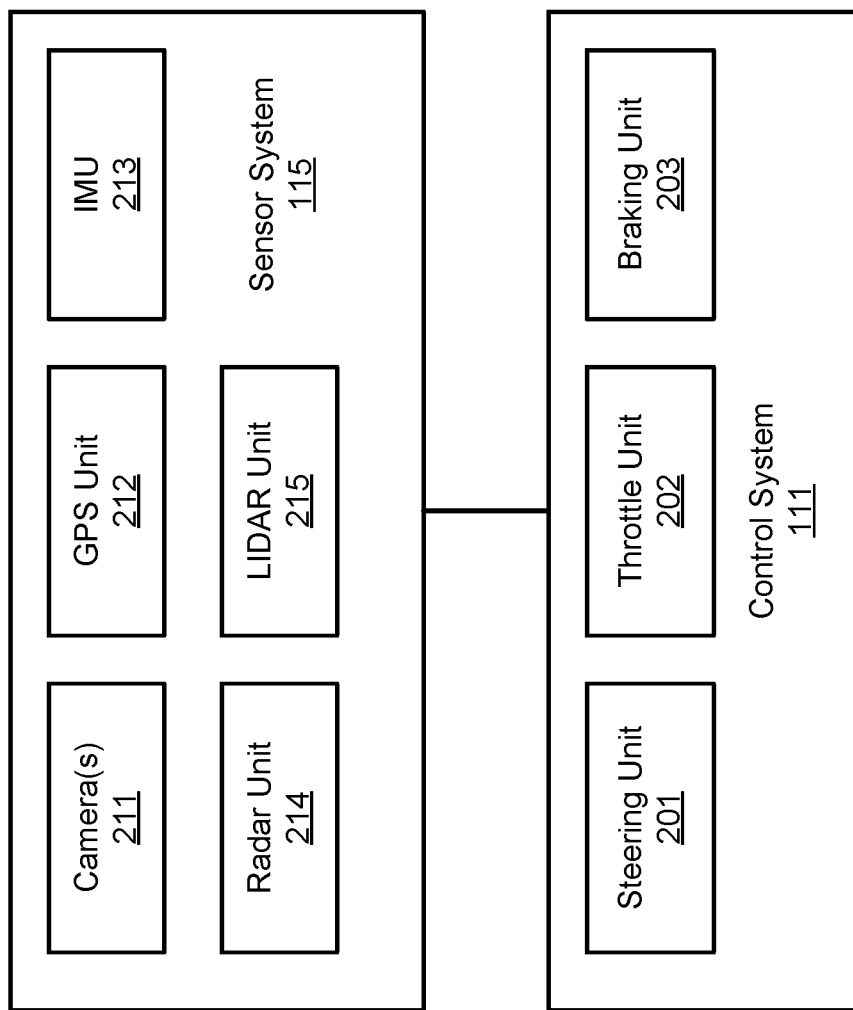
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including models to generate smooth lateral controls/steering for the ADV. Algorithms/models 124 can then be uploaded onto ADVs to be utilized by the ADVs during autonomous driving in real-time.

Figure 3A:
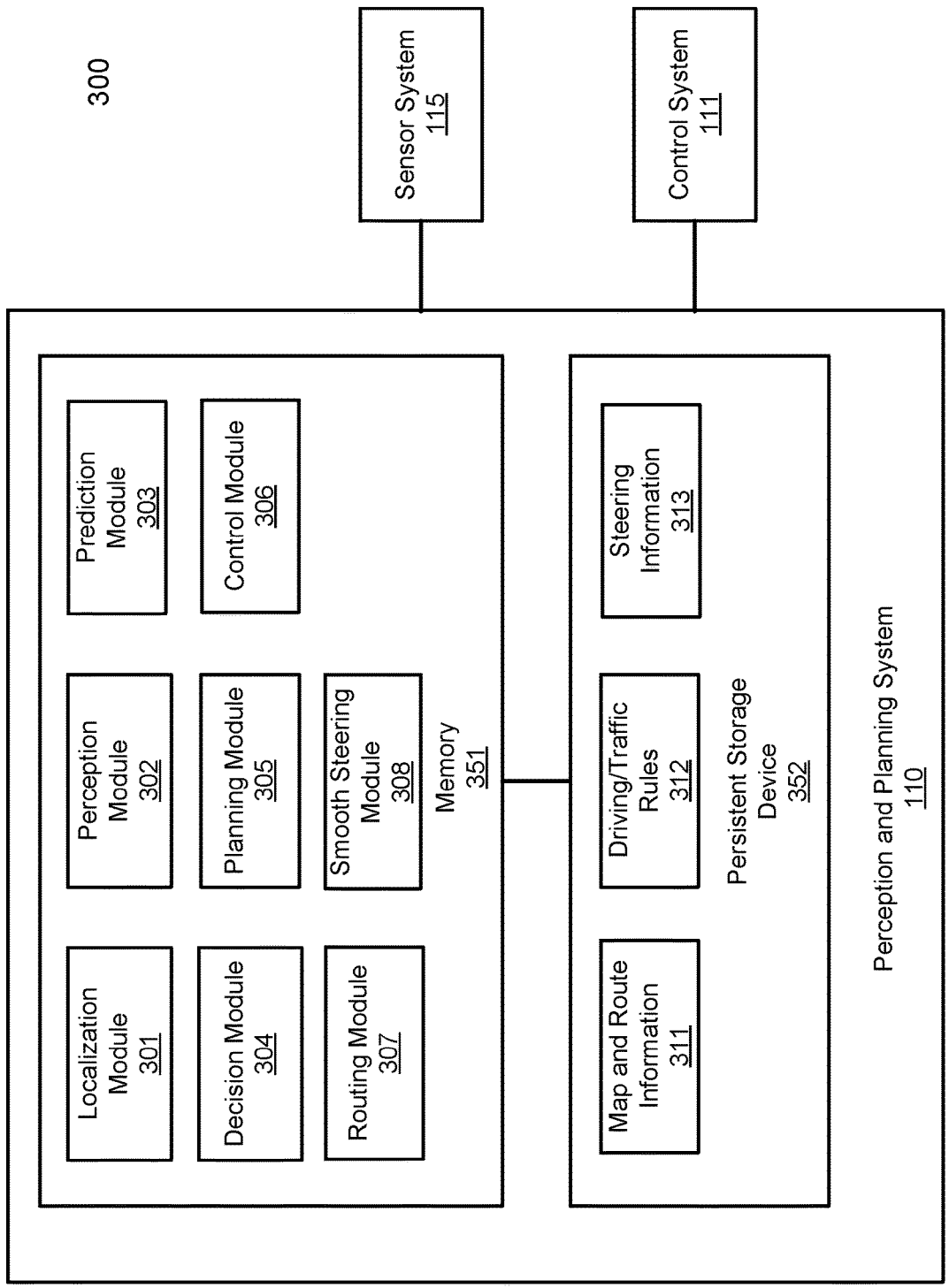
FIGS. 3A-3B are block diagrams illustrating an example of a perception and planning system used with an autonomous vehicle according to one embodiment.
Figure 3B:
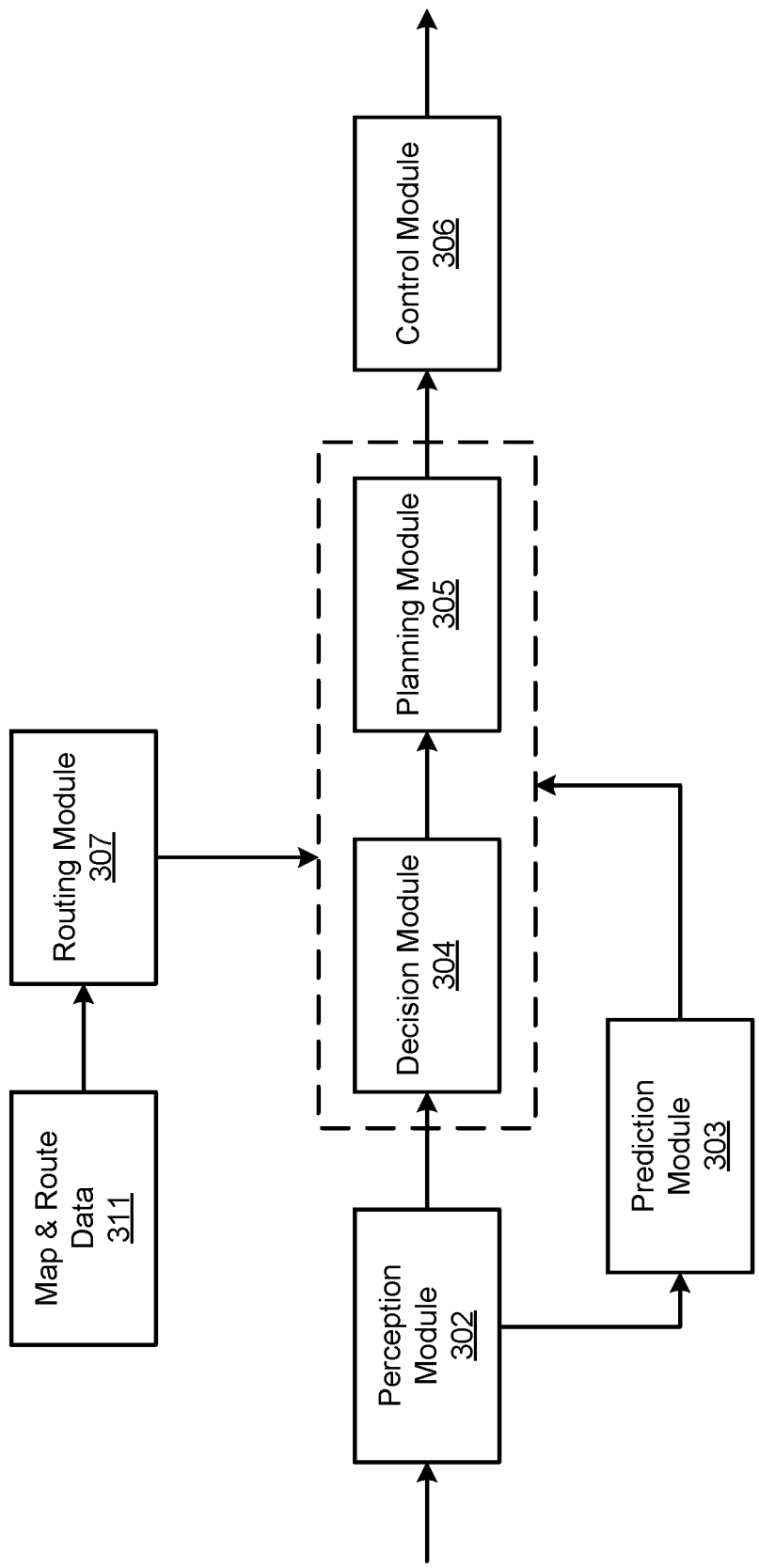

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and smooth steering module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
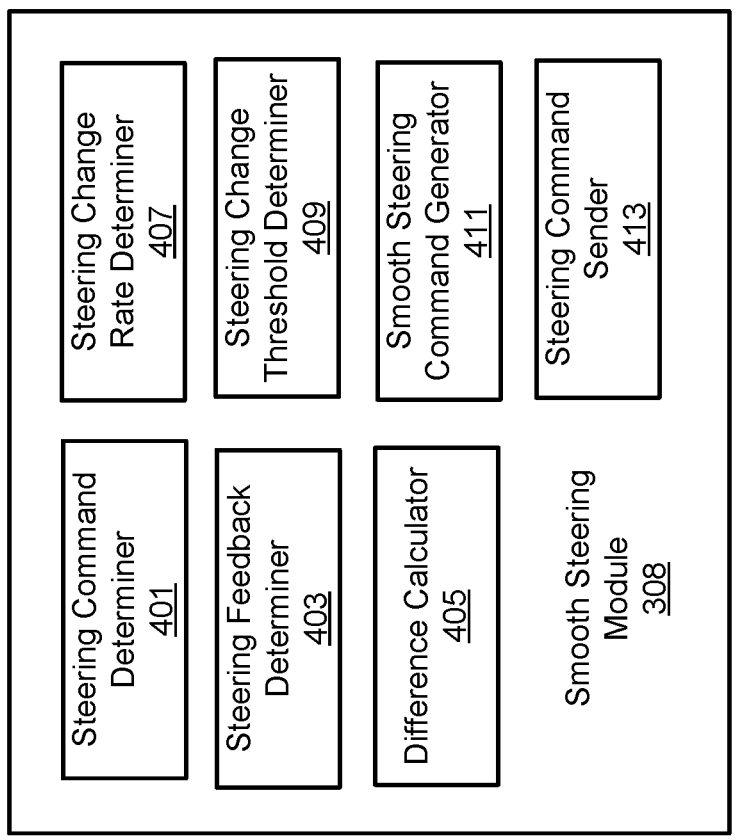
FIG. 4 is a block diagram illustrating a smooth steering module according to one embodiment.

FIG. 4 is a block diagram illustrating an example of a smoothing steering module according to one embodiment. Smoothing steering module 308 can be implemented as a separate module or as a part of control module 306. Smoothing steering module 308 can generate one or more smooth steering commands over one or more planning cycles for the ADV. Referring to FIG. 4, smoothing steering module 308 can include submodules such as steering command determiner 401, steering feedback determiner 403, difference calculator 405, steering change rate determiner 407, steering change threshold determiner 409, smooth steering command generator 411, and steering command sender 413. Steering command determiner 401 can determine a planning steering command of an ADV based on a planning trajectory for the ADV. Steering feedback determiner 403 can determine a current steering feedback for the ADV. These modules may be integrated into fewer number of modules or a single module.

Typically, the steering feedback is a feedback received by the autonomous driving system on a vehicle controller area network (CAN) bus of the ADV. The feedback indicates how much the vehicle has steered. A vehicle has steered when a lateral control is applied to the front wheels of the vehicle to move the vehicle laterally. Difference calculator 405 can calculate a difference between the planning steering command and the steering feedback. Steering change rate determiner 407 can determine a steering change rate for an ADV.

In one embodiment, the steering change rate is determined based on a manufacturer's setting for the ADV. The steering change rate can be a physical limit placed on the ADV to limit how fast the steer can change for the vehicle. Steering change threshold determiner 409 can determine and configure a steering change threshold for the ADV. The steering change threshold can be preconfigured as a software induced upper limit on how quickly the lateral control/steering can change. The steering change threshold can be set according to a default value, e.g., 5 degrees per planning cycle. Smoothing steering command generator 411 can generate a smooth steering command for the ADV. A smooth steering command can be a tapered/dampened steering command that is within a threshold of the current steering feedback. Steering command sender 413 can send a steering command to the CAN bus of the ADV to control a steering of the ADV. Note that although smooth steering module 308 is illustrated as a standalone module, smooth steering module 308 and control module 306 may be an integrated module.

Figure 5C:
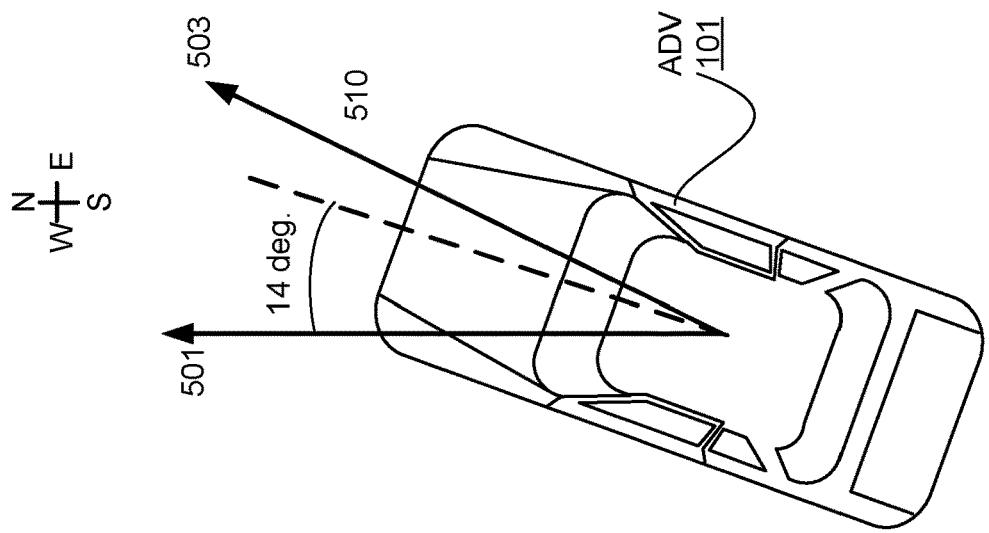
FIGS. 5A-5C illustrate an example of an ADV steering overshoot according to one embodiment.
Figure 5B:
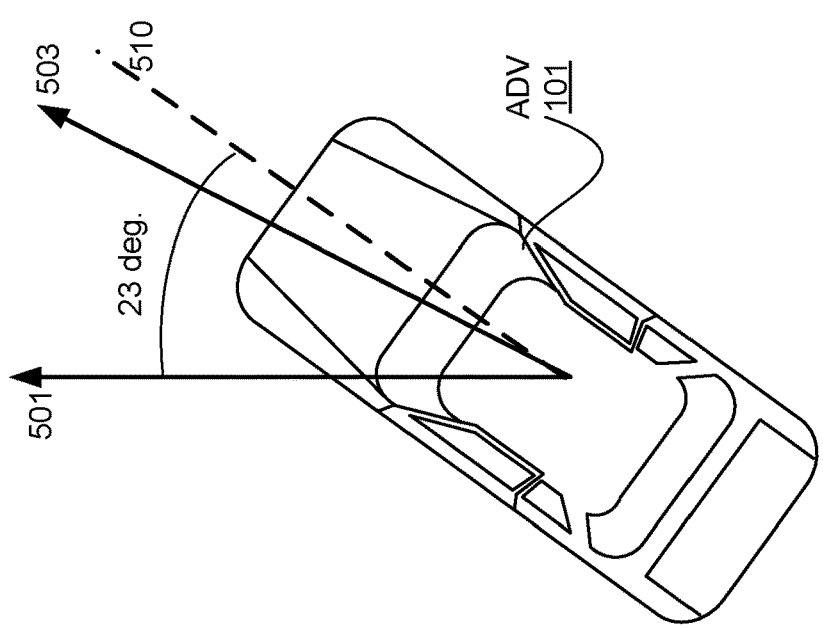
Figure 5A:
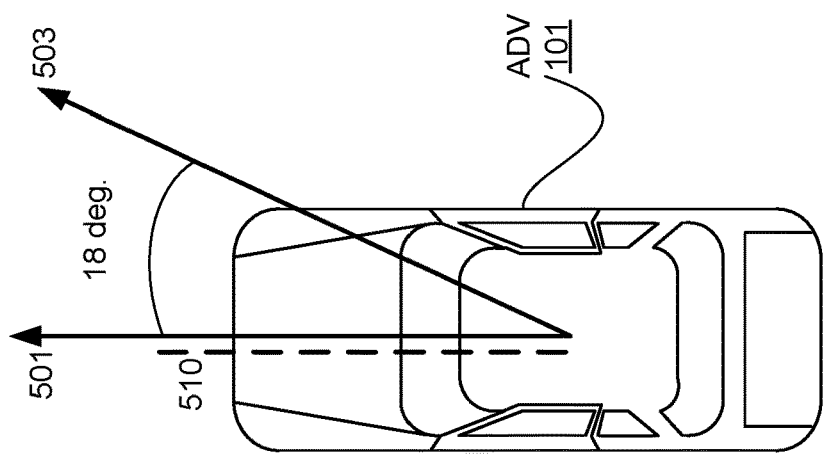

FIGS. 5A-5C illustrate an example of an ADV steering overshoot according to one embodiment. Referring to FIG. 5A, an ADV 101 having an initial trajectory 501 and a current steering direction 510 may have received a planning trajectory 503. The planning trajectory 503 can be planned by a decision/planning system of the ADV 101 to follow a vehicle in front, a change in route/path, or to avoid an obstacle, etc. for ADV 101. In this case, in order to follow the planning trajectory 503, ADV 101 is required to laterally steer 18 degrees to a right of the initial trajectory 501. A steering system that issue an 18 degrees steering command for an ADV without any limit on the steering control may cause the ADV steering to overshoot and oscillate as shown in FIGS. 5B-5C. In this case, ADV 101 overshoots by 23 degrees in a first planning cycle (as shown in FIG. 5B) and oscillates back to 14 degrees in a second planning cycle (as shown in FIG. 5C). In some cases, a steering system that issues a steering command of 23 degrees may be limited depending on the manufacturer setting for the ADV. The issued steering command may steer arbitrarily according to a manufacturer setting of the ADV. The arbitrary steering may cause inconsistent planning results for different ADVs.

Figure 6C:
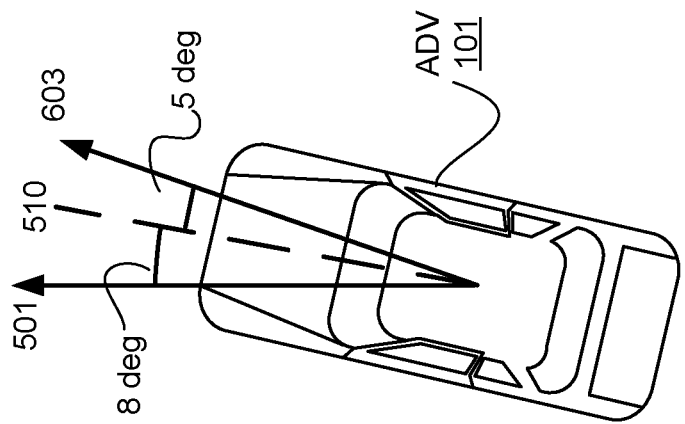
FIGS. 6A-6F illustrate an example of an ADV smooth steering according to one embodiment.
Figure 6B:
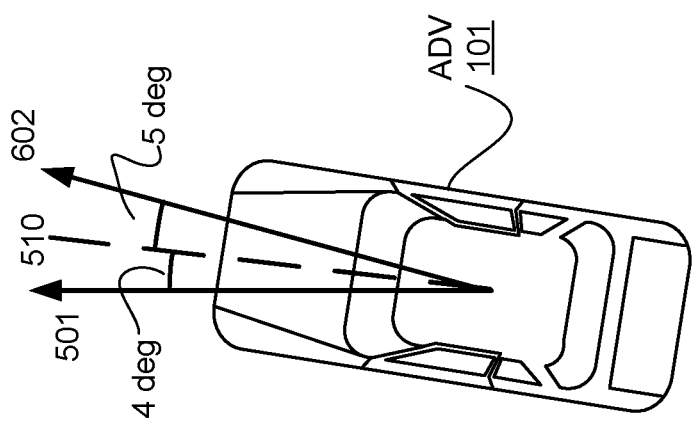
Figure 6A:
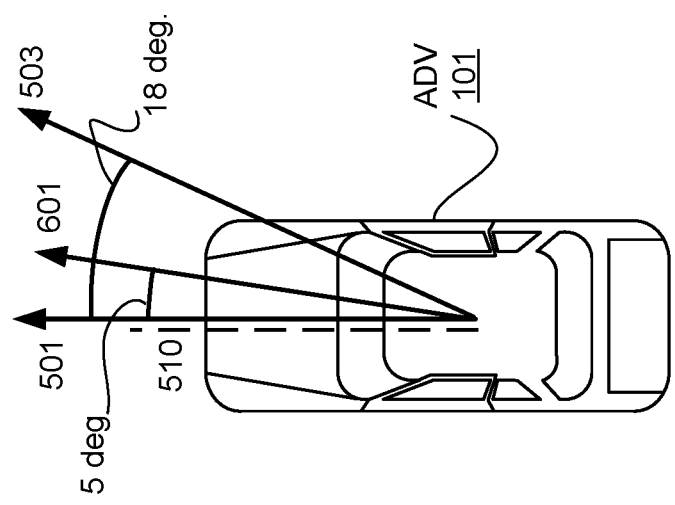

FIGS. 6A-6F illustrate an example of an ADV smooth steering according to one embodiment. Referring to FIG. 6A, an ADV 101 having an initial trajectory 501 and a current steering direction 510 may have received a planning trajectory 503. In one embodiment, ADV 101, via a steering module (e.g., smooth steering module 308 of FIG. 4), determines a planning steering command of ADV. Here, for example, the planning steering command determined here is a lateral control 18 degrees to a right of 510 to place ADV 101 on a path of planning trajectory 503.

Next, ADV 101 determines a current steering feedback from a signal received at the controller area network (CAN) bus for ADV 101. ADV 101 also determines a steering change threshold (threshold) based on a steering change rate set by the manufacturer for the ADV. Assuming the steering change rate is set by the manufacturer to limit how much lateral control the ADV 101 can accommodate, the threshold would be set to be less than the steering change rate per planning cycle. In one embodiment, ADV 101 may have a steering change rate of 500 degrees/second. For a planning system with 100 hertz cycles, the steering change threshold would be 500/100=5 degrees per cycle. In another embodiment, ADV 101 may be set without a steering change rate or some large steering change rate (e.g., 20000 degrees/sec) and the smoothing module may preconfigure the steering change threshold for ADV 101 to a default value, such as, 5 degrees per cycle. Note, the default value may be different depending on the size or type of the underlying vehicle. Here, a sedan vehicle would be preconfigured with different threshold values than a truck. Note that a 5-degree default threshold is used for ADV 101 in FIGS. 6A-6F, for purposes of illustration.

In one embodiment, based on the planning steering command and the current steering feedback, ADV 101 calculates a difference between the current steering command and a current steering feedback. If the different is smaller than (or within) a threshold (here, 5 degrees), the ADV 101 sends the current steering command directly to the CAN bus for execution. If the command is larger than the threshold (here, 5 degrees), the ADV 101 generates incremental smooth steering commands by truncating the current command to +/− threshold (here, +/−5 degrees) and sends the truncated command to the CAN bus for execution.

Smooth steering commands may be generated for several planning cycles to complete the target planning steering command. As shown, referring to FIG. 6A, for the first planning cycle, ADV 101 receives a 0 degrees steering feedback from the CAN bus. Since the target planning steering command of 18 degrees is greater than the (5-degree threshold plus 0 degrees steering feedback), ADV 101 truncates the current command to the threshold of 5 degrees and sends the truncated/smooth steering command 601 to CAN bus for execution.

Referring to FIG. 6B, in a second planning cycle, the steering feedback may change to 4 degrees. Because the target steering command is still 18 degrees, ADV 101 is to generate and send a command 602 of (4+5)=9 degrees to the CAN bus for execution.

Referring to FIG. 6C, in a third planning cycle, the steering feedback may change to 8 degrees. Because the target steering command is still 18 degrees, ADV 101 is to generate and send a command 603 of (8+5)=13 degrees to the CAN bus for execution.

Figure 6F:
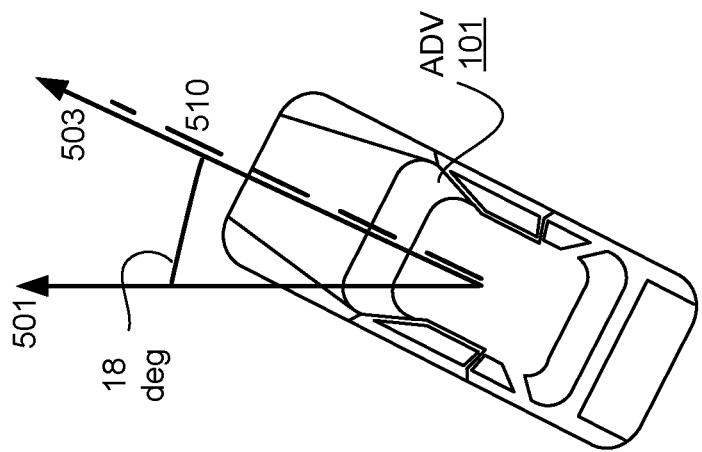
Figure 6E:
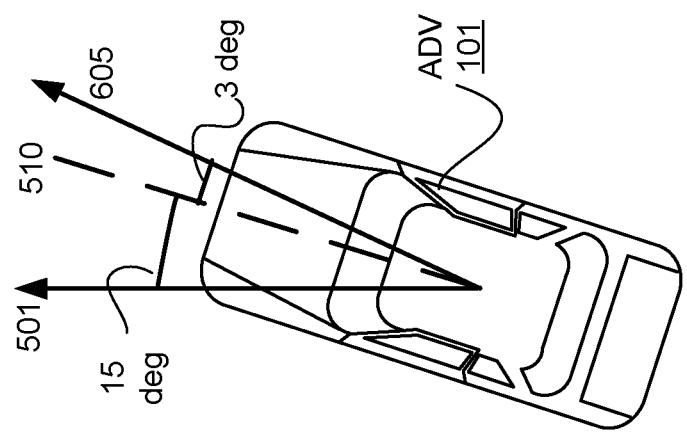
Figure 6D:
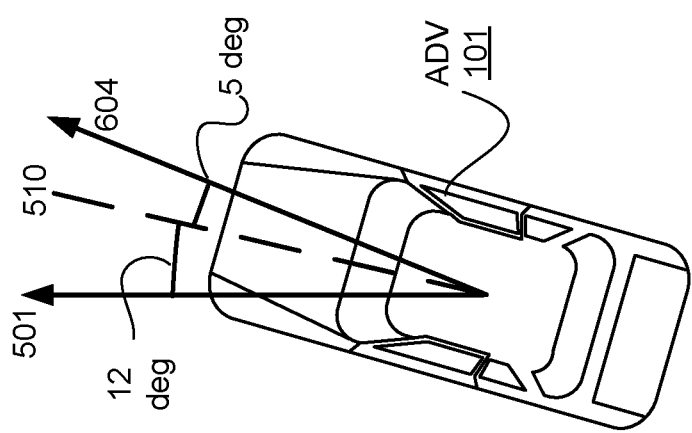

Referring to FIG. 6D, in a fourth planning cycle, the steering feedback may change to 12 degrees. Because the target steering command is still 18 degrees, ADV 101 is to generate and send a command 604 of (12+5)=17 degrees to the CAN bus for execution.

Referring to FIG. 6E, in a fifth planning cycle, the steering feedback may change to 15 degrees. Because the target steering command is still 18 degrees, ADV 101 is to generate and send a command 605 of (15+3)=18 degrees to the CAN bus for execution.

Referring to FIG. 6F, in a sixth planning cycle, the steering feedback may change to 18 degrees. Because the target steering command matches the steering feedback, ADV 101 is determined to be on a path of trajectory 503 and ADV 101 does not issue additional steering commands to the CAN bus for execution. Here, the maximum possible change in steering has been limited by the steering change threshold to reduce overshoot and oscillation. Note, a smoothing module of ADV 101 can preconfigure the steering change threshold and guide the ADV 101 to execute steering commands smoothly (e.g., no overshoot/oscillation).

Figure 7:
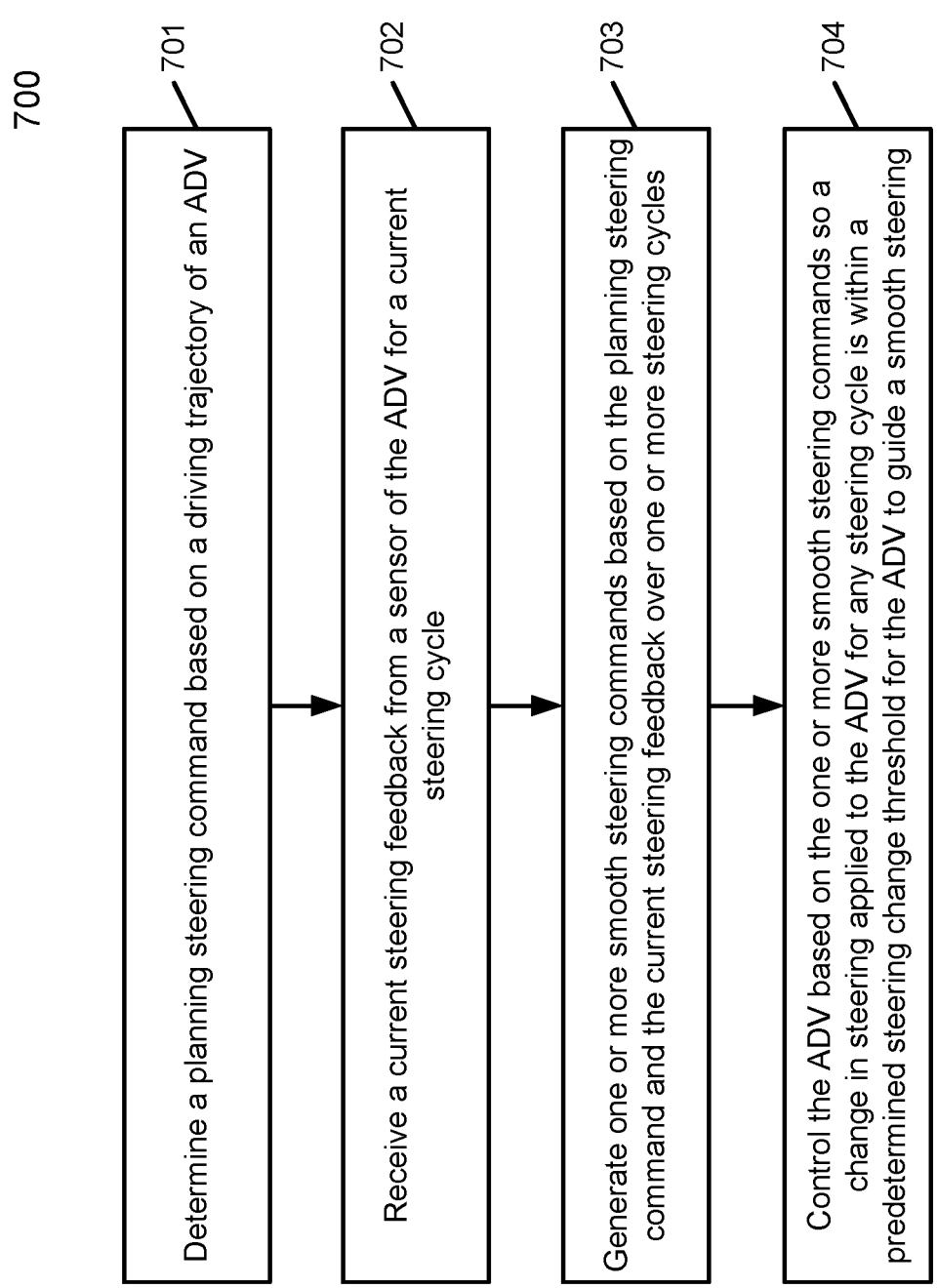
FIG. 7 is a flow diagram illustrating a method performed by an ADV according to one embodiment.

FIG. 7 is a flow diagram illustrating a method performed by an ADV according to one embodiment. Processing 700 may be performed by processing logic which may include software, hardware, or a combination thereof. For example, process 700 may be performed by smooth steering module 308 of FIG. 4. Referring to FIG. 7, at block 701, processing logic determines a planning steering command based on a driving trajectory of an ADV. At block 702, processing logic receives a current steering feedback from a sensor of the ADV for a current planning cycle. At block 703, processing logic generates one or more smooth steering commands based on the planning steering command and the current steering feedback over one or more planning cycles. At block 704, processing logic controls the ADV based on the one or more smooth steering commands so a change in steering applied to the ADV for any planning cycle is within a predetermined steering change threshold for the ADV to guide a smooth steering.

In one embodiment, generating one or more smooth steering commands based on the planning steering command and the current steering feedback over one or more planning cycles includes for each planning cycle, calculating a difference between the planning steering command and the current steering feedback, if the difference is within the predetermined steering change threshold, generating a next smooth steering command to be the planning steering command, and if the difference is greater than the predetermined steering change threshold, generating the next smooth steering command to be a sum of the current steering feedback and the predetermined steering change threshold. In one embodiment, controlling the ADV based on the one or more smooth steering commands includes sending the next current steering command to a control area network (CAN) bus for the ADV to execute the next smooth steering command.

In one embodiment, processing logic further determines a steering change rate for the ADV based on a manufacturer setting for the ADV, where the predetermined steering change threshold is set based on the steering change rate for the ADV. In one embodiment, processing logic further sets the predetermined steering change threshold to be a minimum of a default steering change value or the steering change rate determined based on the manufacturer setting for the ADV.

In one embodiment, processing logic further sets the predetermined steering change threshold to be the default steering change value if the manufacturer setting for the ADV lacks the steering change rate. In one embodiment, the default steering change value is approximately five degrees per planning cycle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    determining a planning steering command based on a driving trajectory of an ADV;
    receiving a current steering feedback from a sensor of the ADV for a current planning cycle;
    generating one or more smooth steering commands based on the planning steering command and the current steering feedback over one or more planning cycles; and
    controlling the ADV based on the one or more smooth steering commands, such that a change in steering applied to the ADV for any planning cycle is within a predetermined steering change threshold for the ADV to guide a smooth steering.

2. The computer-implemented method of claim 1, wherein generating one or more smooth steering commands based on the planning steering command and the current steering feedback over one or more planning cycles comprises:
    for each planning cycle, calculating a difference between the planning steering command and the current steering feedback;
    if the difference is within the predetermined steering change threshold, generating a next smooth steering command to be the planning steering command; and
    if the difference is greater than the predetermined steering change threshold, generating the next smooth steering command based on the current steering feedback and the predetermined steering change threshold.

3. The computer-implemented method of claim 2, wherein controlling the ADV based on the one or more smooth steering commands includes sending a next current steering command to a control area network (CAN) bus for the ADV to execute the next smooth steering command.

4. The computer-implemented method of claim 2, wherein if the difference is greater than the predetermined steering change threshold, the next smooth steering command is calculated as a sum of the current steering feedback and the predetermined steering change threshold.

5. The computer-implemented method of claim 1, further comprising:
    determining a steering change rate for the ADV based on a manufacturer setting for the ADV, wherein the predetermined steering change threshold is configured based on the steering change rate for the ADV.

6. The computer-implemented method of claim 5, further comprising setting the predetermined steering change threshold to be a minimum of a default steering change value or the steering change rate determined based on the manufacturer setting for the ADV.

7. The computer-implemented method of claim 6, further comprising setting the predetermined steering change threshold to be the default steering change value if the manufacturer setting for the ADV lacks the steering change rate.

8. The computer-implemented method of claim 7, wherein the default steering change value is approximately five degrees per planning cycle.

9. A non-transitory machine-readable medium having instructions stored therein, which when executed by one or more processors, cause the one or more processors to perform operations, the operations comprising:
   determining a planning steering command based on a driving trajectory of an ADV;
   receiving a current steering feedback from a sensor of the ADV for a current planning cycle;
   generating one or more smooth steering commands based on the planning steering command and the current steering feedback over one or more planning cycles; and
   controlling the ADV based on the one or more smooth steering commands, such that a change in steering applied to the ADV for any planning cycle is within a predetermined steering change threshold for the ADV to guide a smooth steering.

10. The non-transitory machine-readable medium of claim 9, wherein generating one or more smooth steering commands based on the planning steering command and the current steering feedback over one or more planning cycles comprises:
   for each planning cycle, calculating a difference between the planning steering command and the current steering feedback;
   if the difference is within the predetermined steering change threshold, generating a next smooth steering command to be the planning steering command; and
   if the difference is greater than the predetermined steering change threshold, generating the next smooth steering command based on the current steering feedback and the predetermined steering change threshold.

11. The non-transitory machine-readable medium of claim 10, wherein controlling the ADV based on the one or more smooth steering commands includes sending a next current steering command to a control area network (CAN) bus for the ADV to execute the next smooth steering command.

12. The non-transitory machine-readable medium of claim 10, wherein if the difference is greater than the predetermined steering change threshold, the next smooth steering command is calculated as a sum of the current steering feedback and the predetermined steering change threshold.

13. The non-transitory machine-readable medium of claim 10, wherein the operations further comprise:
   determining a steering change rate for the ADV based on a manufacturer setting for the ADV, wherein the predetermined steering change threshold is configured based on the steering change rate for the ADV.

14. The non-transitory machine-readable medium of claim 13, wherein the operations further comprise setting the predetermined steering change threshold to be a minimum of a default steering change value or the steering change rate determined based on the manufacturer setting for the ADV.

15. The non-transitory machine-readable medium of claim 14, wherein the operations further comprise setting the predetermined steering change threshold to be the default steering change value if the manufacturer setting for the ADV lacks the steering change rate.

16. The non-transitory machine-readable medium of claim 15, wherein the default steering change value is approximately five degrees per planning cycle.

17. A data processing system, comprising:
   one or more processors; and
   a memory coupled to the one or more processors to store instructions, which when executed by the one or more processors, cause the one or more processors to perform operations, the operations including
      determining a planning steering command based on a driving trajectory of an ADV;
      receiving a current steering feedback from a sensor of the ADV for a current planning cycle;
      generating one or more smooth steering commands based on the planning steering command and the current steering feedback over one or more planning cycles; and
      controlling the ADV based on the one or more smooth steering commands, such that a change in steering applied to the ADV for any planning cycle is within a predetermined steering change threshold for the ADV to guide a smooth steering.

18. The system of claim 17, wherein generating one or more smooth steering commands based on the planning steering command and the current steering feedback over one or more planning cycles comprises:
   for each planning cycle, calculating a difference between the planning steering command and the current steering feedback;
   if the difference is within the predetermined steering change threshold, generating a next smooth steering command to be the planning steering command; and
   if the difference is greater than the predetermined steering change threshold, generating the next smooth steering command based on the current steering feedback and the predetermined steering change threshold.

19. The system of claim 18, wherein controlling the ADV based on the one or more smooth steering commands includes sending a next current steering command to a control area network (CAN) bus for the ADV to execute the next smooth steering command.

20. The system of claim 17, wherein the operations further comprise:
   determining a steering change rate for the ADV based on a manufacturer setting for the ADV, wherein the predetermined steering change threshold is configured based on the steering change rate for the ADV.

* * * * *